July 6, 1943.    A. R. LUKENS    2,323,550
FILLER MATERIAL FOR PAINT, RUBBER, PAPER, ETC
Filed Aug. 3, 1940
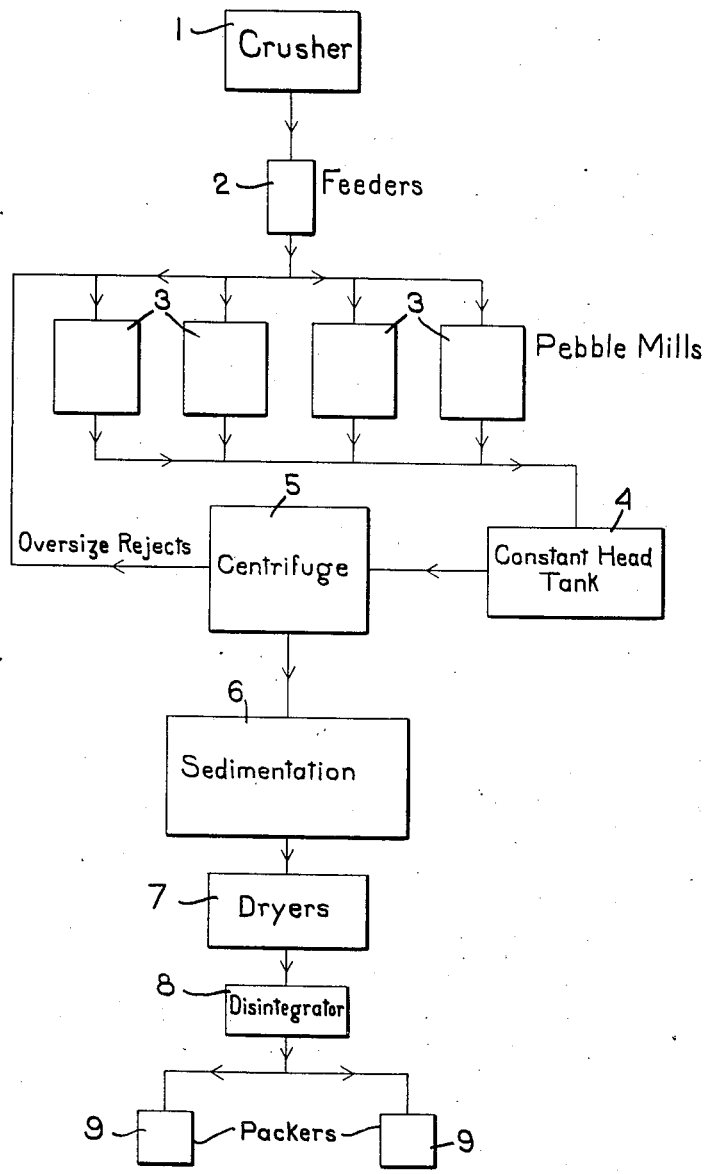
Inventor.
Alan R. Lukens
by Heard, Smith & Tennant.
Attys Patented July 6, 1943

2,323,550

UNITED STATES PATENT OFFICE 2,323,550

FILLER MATERIAL FOR PAINT, RUBBER, PAPER, ETC.

Alan R. Lukens, Belmont, Mass.

Application August 3, 1940, Serial No. 350,267

12 Claims. (Cl. 260—765)

This invention relates to an inert filler in the form of calcium carbonate, which has new functions of usefulness when it comprises a part of the composition of paper, paints, ceramic objects, floor coverings, pharmaceuticals, rubber vulcanizates, vibration reproducing devices, etc.

Whiting, which I shall hereinafter more specifically refer to as powdered calcium carbonate, has long been used and recognized as a useful ingredient in many compositions.

Until recent years the most important source of whiting was obtained from deposits called chalk deposits in England and upon the European Continent. Examination has proved this material to be minute particles of calcium carbonate in the form of the shell remains of sea animals, such as coccolithophores, foraminifera and the like. This form of whiting has been found to be variable in particle size and to contain variable proportions of impurities, such as flint, etc. The particle structure has been found to be somewhat spongy and the surfaces covered to some extent by mineral salts other than calcium carbonate.

Another form of finely divided calcium carbonate which has been developed through the activities of many inventors is what is commercially known as precipitated whiting. Precipitated whitings are in general produced from the precipitation of calcium carbonate when calcium ions in solution are reacted upon by carbonic acid in suh a way as to produce insoluble particles of calcium carbonate. It has been claimed that theoretically the best way to produce a calcium carbonate pigment of fine particle size was by precipitation. Calcium carbonate particles when so produced and while in the process of manufacture develop a strong tendency for crystal growth and for particle cementation, so that most precipitated calcium carbonate pigments when dried to a powder consist of particles under ½ micron in diameter together with larger crystals and aggregates of fine particles more or less tightly cemented together.

It is generally recognized that such carbonates, due to their method of manufacture, have strongly adsorbed upon their surfaces alkalies and other salts inherent from the process of manufacture. Many procedures have been devised to minimize these salts because they have been found to be distinctly harmful to many compositions into which they are introduced. Absolutely complete removal of these impurities, while it may be accomplished in the laboratory after considerable effort, is practically impossible in commercial practice.

Another form of whiting has been produced by grinding limestone, marble and other forms of essentially pure calcitic rock. This material as heretofore made seemed to have limited usage and was generally sold at a low price and found to be relatively coarse in particle size when compared with precipitated whitings and natural chalk whitings.

My present invention relates to the ground calcite rock type of whiting, the surfaces of the particles of which I have discovered are essentially clean and free from contaminating salts and other impurities and that such particles are not spongy and/or composed of cemented aggregates in such a manner as to be highly absorptive.

My investigations have shown that ground calcite limestone particles smaller than 15 microns in diameter will adhere tenaciously to rubber compositions, whereas larger particles tend to loosen readily when the rubber is stretched or flexed and that such particles when wet-ground are markedly superior to dry-ground particles of the same size in dispersability, adhesion and other characteristics.

When a ground calcite powder is used as a part of a coating upon paper, particles larger than 15 microns in diameter tend to abrade the type and interfere with good definition of print.

When ground calcite powder is used as a filler for paint, particles larger than 15 microns readily dull the glossy surface of the paint. Furthermore, particles larger than 15 microns irritate mucous membrane when calcite powder is incorporated into tooth powders, tooth pastes, or pharmaceutical tablets or powders. Again, if ground calcite powder is used in ceramic glazes, particles larger than 15 microns tend to place unwanted concentrations of calcium carbonate in certain parts of the glaze, thus producing a defective surface.

Calcium carbonate is used in the manufacture of vibration records such as phonograph records and it is found that particles larger than 15 microns produce a rough groove in the record.

In products made in accordance with my method, at least 99.8% by weight is composed of particles smaller than 15 microns and thus the disadvantages above referred to are not present.

I have also discovered that ground calcite rock when reduced to a powder form comprising calcium carbonate particles of calcite form of which 99.8% by weight are smaller than 15 microns, which have a weight mean average particle diameter of approximately 3.7 microns, not less than 17% by weight of particles having an average diameter of 1 micron, and in which the particles smaller than 1 micron shall be sufficient in number and dimension that the particulate specific surface area shall not be less than 20,000 square feet per pound, has unexpected and superior qualities when used as a filler for paint, rubber, paper, plastics, etc., or as a coating for paper, and also when put to other uses.

Furthermore, I have found that a ground calcium carbonate such as above described and having a specific surface area of not less than 20,000 square feet per pound will develop useful functions among which are the following:

1. Opacity in cold water paints or coated papers where the coating or paint film is secured by water soluble glues, such as casein, starch or soya bean protein glue.
2. An ability to preferentially bond the non-volatile vehicles in oleoresinous paints and inhibit the absorption of such into porous surfaces, such as wood, cloth or paper.
3. An ability to develop a high degree of brightness when the calcite from which the powder is ground is free from discoloring contaminations.

In developing my improved product, I proceeded to fractionate ground calcitic rock into fractions of limited size, and by "fractions of limited size" I mean groups of particles in which the particles are all approximately of the same diameter. Such fractions were made in groups representing particles of the largest diameter found in commercial whitings down to fractions of particles whose diameters were less than ½ micron.

It was found that when the particle diameter was reduced below certain dimensions, certain new functions of usefulness became apparent and by blending together certain proportions of these particles smaller than a given diameter, other useful functions were developed. This blending together of particles is generally termed "aggregation."

For many years there have been devices available for grinding materials such as calcitic rock and such devices will produce, if sufficient work is applied, substantial portions of particles smaller than those above referred to and which I have found to be the limiting factor necessary to produce the new functions of usefulness to which reference is herein made.

In order to give a better understanding of my invention, it may be well to define such terms as "weight mean diameter," "specific surface area," "void ratio," etc., which will be hereinafter used.

The size of a single particle is generally specified as its diameter.

The definitions of the diameter of irregular particles as explained by Harold Heywood in an article in Proceedings of the Institution of Mechanical Engineers, London, volume 123, pages 383 to 460, and volume 140 (1938) pages 257 to 348, are generally accepted.

When dealing with a material composed of particles of different sizes, it is common to define an average diameter. There are several different types of average diameter, each best suited to some purpose. I have found the weight mean particle diameter to be the best suited designation for my purposes and will define it in connection with particle size distribution.

The surface area of a regular particle can be calculated from its diameter. Specific surface is surface area per unit weight. Specific surface of a regular particle can be calculated from its diameter $(x)$ and its density $(p)$. Thus for a sphere it is $6/px$. The specific surface of irregular particles must be determined experimentally. For ground calcite, the ratio of actual surface to theoretical surface calculated from diameter, was determined by Gross, "Crushing and Grinding," Bulletin 402, U. S. Bureau of Mines (1938). For a particulate material composed of different sized particles, the specific surface $(\overline{S})$ is the sum total of all the particle surface areas per unit weight of material, and this may be expressed in square feet per pound or square centimeters per gram. This may be determined experimentally, or calculated in the case of known size distribution.

One widely used method (Heywood, I. M. E. volume 120, p. 259 $(a)$) of designating distribution of sizes in particulate materials is to specify the percentage by weight of material present in sizes larger than a given size. Any complete description of size distribution states these percentages over the entire range of particle sizes present. Let the symbol R designate the fraction of material larger than a given diameter $x$. The accepted definition of weight mean particle diameter, $(x_w)$, is:

$$x_w = \int_{R=1}^{R=0} x\,dR$$

Using this notation, the specific surface $(\overline{S})$ of a material, composed of regular particles of uniform shape, is given by the formula:

$$\overline{S} = \int_{R=1}^{R=0} \frac{6}{px}\,dR$$

A number of mathematical formulas have been proposed to express the relation between per cent by weight (100 R) and particle diameter $(x)$. They have been reviewed by J. B. Austin in Journal of Industrial and Engineering Chemistry, Analytical Edition, vol. 11, pages 334 to 339 (1939). Among these formulas is the relation proposed by Rosin and Rammler. This relation I have found to approximate closely the distribution of particle sizes in my product. Simply stated, this is a designation of the relation between R and $x$ by means of the two parameters $x_w$ and $n$, of which $x_w$ is the weight mean particle size, and $n$ a parameter which, to quote Austin, "is a measure of the dispersion of the distribution." The equation of the Rosin-Rammler law is as follows:

$$R = e^{-\left(\frac{1}{n}\cdot\frac{x}{x_w}\right)^n}$$

By accepted mathematical operations as are indicated by Heywood I. M. E., vol. 125, pp. 442 ff., the formula for the specific surface of a regular, uniform material in Rosin-Rammler distribution can be derived, and S calculated therefrom for any set of values of $x_w$, $n$ and $p$. Furthermore, the parameters enable the distribution of total specific surface among the different sizes to be calculated.

From the data of Gross, previously referred to, a value of 1.35 was obtained for the ratio of actual to theoretical surface $(\tau)$ for a ground calcite within the scope of my invention. The specific gravity of calcite is 2.70.

The recognized formula for specific surface and the dimensional quantities which enter, is as follows:

$$\overline{S} = \frac{6\tau}{px_w}\Gamma\left(1+\frac{1}{n}\right)\Gamma\left(1-\frac{1}{n}\right)$$

in which P = the specific gravity in grams per cubic centimeter (cm.³); $x_w$ = the weight mean particle diameter in centimeters (cm.).
Thus:

$$\overline{S} = \left(\frac{cm.^3}{grams}\right)\left(\frac{1}{cm.}\right) = \frac{cm.^2}{grams}$$

To determine experimentally the particle size distribution of my product, I used the Andreason method described in detail by Heywood, I. M. E., vol. 140, p. 279 ff.

Such a distribution analysis of a ground calcium carbonate product coming within my invention and representing approximately the most coarse limitation thereof, is as follows:

| Wt. is less than size | Wt. is less than size |
|---|---|
| 99.8% <15 microns | 20% <1.2 microns |
| 96. % <10.5 microns | 14% <0.83 micron |
| 80. % < 6.0 microns | 9% <0.56 micron |
| 70. % < 4.7 microns | 5% <0.35 micron |
| 60. % < 3.7 microns | 3% <0.23 micron |
| 50. % < 3.0 microns | 2% <0.15 micron |
| 40. % < 2.4 microns | 1% <0.085 micron |

By applying the graphical method for dealing with materials following the Rosin-Rammler distribution as described by Austin, I determined the parameters of this analysis to be $x_w=3.7$ microns, $n=1.20$.

The above formula may be also written as follows:

$$\frac{\overline{S}X_w}{\tau}=6\Gamma\left(1+\frac{1}{1.2}\right)\Gamma\left(1-\frac{1}{1.2}\right)=31.41=6\times 5.235$$

Substituting the parameters found to represent approximately the most coarse limitation given above $X_w=3.7$ microns $=0.00037$ cm.
$P=2.7$ grams per cm.$^3$
$\tau=1.35$ (using data of Gross)

thus $$\overline{S}=\frac{1.35\times 6\times 5.235}{2.7\times .00037}=42,400 \text{ cm.}^2 \text{ per gram}$$

Translating this into English units $$\overline{S}=42,400\times\frac{454}{(30.5)^2}=20,600 \text{ sq. ft. per lb.}$$

The specific surface area of my material as calculated as I have above described is 11,100 square millimeters per cubic millimeter, or 20,000 square feet per pound. The distribution of this surface is given in the following table:

*Distribution of specific surface area of a calcite powder embodying my invention having a weight mean diameter of 3.7 microns parameter of 1.20, and in which 99.8% by weight of the mass is composed of particles smaller than 15 microns and of which 17% by weight is composed of particles less than 1 micron in diameter*

| Dimension of particles, microns | Per cent of total specific surface | Square feet per pound |
|---|---|---|
| 0 to 1 | 81 | 16,200 |
| 1 to 2 | 8.5 | 1,700 |
| 2 to 5 | 8 | 1,600 |
| 5 to 15 | 2.5 | 500 |
| 0 to 15 | 100.0 | 20,000 |

The fact that 16,200 square feet of surface area is found in particles smaller than 1 micron shows that my improved product is very finely ground and it is partially because of the large proportion of the total surface area being found in particles less than 1 micron in diameter that my improved product functions as it does when used as a filler.

*Table of nomenclature as used in the above equations*

$e$=base of Naperian logarithms
$n$=exponent in the Rosin-Rammler equation; equal to the slope of the cumulative distribution curve on a log-log plot.
$R$=fractional residue, by weight or volume, of material greater in diameter than $x$
$S$=specific surface, the surface associated with unit weight of material
$x$=particle diameter
$x_w$=weight mean particle diameter $$\Gamma(n)=\int_0^\infty x^{n-1}e^{-x}dx=(n-1)$$

Any volume or mass of compacted particles contains both particles and void spaces between the particles. The void ratio, which is defined as the ratio of void space to the volume occupied by particles, is a function of the particle size distribution. It has been indicated by Andreasen in VDI Forschungsheft 399 (Dec., 1939) that a minimum void content is theoretically obtained with a distribution quite similar to particle aggregations which follow the Rosin-Rammler law.

I have demonstrated that an enamel made with my product, that is, rock calcite which is mechanically reduced by grinding to a particle size of sufficient smallness so that the specific surface area exceeds approximately 20,000 square feet per pound and having a maximum particle size such that 99.8% by weight of the material does not exceed 15 microns in diameter and that the weight mean average diameter does not exceed approximately 3.7 microns and not less than 17% by weight of particles are smaller than 1 micron in diameter, will give a satisfactory lack of penetration into porous surfaces such as unpainted wood or paper, and at the same time will develop an unusually high gloss retention property.

The Church and McClure United States Patent No. 2,034,797, March 24, 1936, describes a precipitated calcium carbonate product in which the particles are provided with a thin surface film of rosin or the like and the claim is made that an enamel or paint made with this product has exceptionally good non-penetrating and sealing features.

I have used my improved product such as above described in the manufacture of an enamel made up as follows:

|  | Pounds |
|---|---|
| "Amberol" resin | 700 |
| Manganese linoleate | 5 |
| Zinc resinate | 49 |
| Cobalt linoleate | 3.5 |
| Raw China-wood oil | 927 |
| Bodied linseed oil | 232 |
| Gum turpentine | 290 |
| Mineral spirits | 2030 |

The inert pigment carbonate embodying my invention was admixed with the above in the ratio of 1 volume of carbonate to 1.6 volumes of non-volatile paint vehicle.

The above non-volatile vehicles were cooked by nominal trade procedures. China-wood oil was heated to 260° C. and so held for a string. This was checked with the "Amberol." The temperature was then raised to 275° C. and cooled again by addition of the balance of the non-volatiles. Such non-volatiles were added at 200° C. The carbonate embodying my invention was added by grinding two passes through a stone mill.

The table below gives comparative ratings between an enamel embodying calcium carbonate made in accordance with my invention and similar enamel made with other calcium carbonates.

| Character of calcium carbonate used | Comparative ratings | | Penetration |
| --- | --- | --- | --- |
| | Initial gloss | 90 day gloss | |
| Ground limestone whiting, finest grade commercially obtainable other than my product. | 5 | 5-6 | Penetrates. |
| My product, described herein. | 1½ | 2 | No penetration. |
| Precipitated whiting coated with 1% rosin. | 1 | 3¼ | Do. |
| Precipitated whiting, not coated, showing a specific surface of 25,000 square feet per pound. | 7 | 9 | Penetrates badly. |

In the above table the highest gloss is indicated by the smallest figure and it will be seen that an enamel made with my improved product has an initial gloss nearly as high as that made with precipitated whiting in which the particles are coated with rosin and that after a ninety-day period the enamel made with my improved product had a higher gloss than that made with the precipitated whiting having coated particles.

I believe this useful characteristic which is shown by the above table is due to the natural bonding ability of calcite particles when the surface of each particle is clean and uncontaminated by alkaline salts such as result upon calcium carbonates produced by processes of precipitation or such as are often inherent in natural chalk whiting.

When such a clean surfaced calcite is reduced in particle size by processes which will not contaminate these surfaces but will develop smallness such as will yield a specific surface area of not less than approximately 20,000 square feet per pound, such a powder will hold immobile the non-volatile gums, resins and oils in a paint or varnish when such is spread upon a porous surface. This immobility preferentially restricts the penetration of the paint into the porous surface.

I have referred above to the use of my improved product in the manufacture of enamel. It is also of special advantage in the manufacture of oil paint. I have found that a paint of the required fluidity can be made when using my product as a pigment by the use of less oil than is required when fillers of the usual type are used. I attribute this to the fact that in my improved product the particles are of solid crystalline calcitic form derived by mechanically reducing limestone or marble to the particle size above specified and that the particles thus produced have clean surfaces and non-porous bodies so that a minimum amount of oil is required to wet the surfaces of the particles. Furthermore, a product having the characteristics above described has a relatively low void content and this fact also reduces the oil absorption of the filler. I have found that with the use of calcium carbonate having the above characteristics, the absorption of refined linseed oil by the so-called "rub-out test" is only about fifteen as compared with a "rub-out test" of thirty to forty with a filler having an equivalent range of particle size formed of precipitated calcium carbonate, or a filler of calcium sulphate, or a filler of clay, these being the fillers heretofore commonly used in the manufacture of paint. The so-called "rub-out" test indicates the amount of linseed oil or other suitable drying oil necessary to plasticize 100 pounds of filler, and the reference above to a "rub-out test" of fifteen means that with my improved product only 15 pounds of linseed oil or other equivalent drying oil is required to plasticize 100 pounds of my improved calcium product, whereas from 20 to 40 pounds of linseed oil will be required to produce equivalent workability of precipitated calcium carbonate, calcium sulphate, clay, etc., which are commonly used in the paint industry. The oil is the expensive ingredient in a paint, as the filler is usually very inexpensive. My improved product, therefore, provides for the manufacture of high quality paint at a very considerable saving over present methods of manufacture.

An oil paint made with my improved filler in which the calcium carbonate particles of calcitic form are sub-divided to such small size as to provide a specific surface area in excess of 20,000 square feet per pound is an exceptionally good non-penetrating and sealing paint and it also has a better gloss retention than paint films produced by the use of fillers usually employed.

A characteristic of my improved filler is its individuality of particles ranging from the maximum size to minimum size, and its opacity. The opacity results to a considerable extent from the fact that the individual particles have the calcite form and thus have flat, smooth, light-reflecting faces as well as from the high ratio of surface area to weight. This, together with the gradation of particle sizes which results in an aggregate with a low void content, provides a filler which does not facilitate the passage of light, and has a relatively high degree of opacity. This is a decided advantage when the product is used as a filler for paper or paint.

My investigations have shown that the clean surfaces of the particles of my product which are free from water-soluble acids, alkalies and salts provide a preferential absorption for the vehicle of the paint, thus providing a preferential tendency for such vehicle to remain on the surface of the particles rather than to migrate to the surface to which the paint is applied, and I believe it is this preferential tendency which gives paint made with my product the superior nonpenetrative and sealing characteristics.

As applied to the manufacture of coating for paper, my improved product also results in very material savings. Paper coating material is commonly made by mixing the filler material with casein to produce an adhesive coating material. I find that when my improved calcium carbonate product is used for making the paper coating material, it will only be necessary to use about 220 pounds of casein for each ton of the calcium carbonate product to produce a proper coating material, whereas from 350 to 650 pounds of casein will be required where the filler material is a precipitated calcium carbonate. This reduction in the amount of casein required to produce a proper paper coating material results from the fact that the individual particles of my improved product are calcite and have the smooth faces so that relatively little casein is required for wetting the faces of the particles and, since the product has a low void content, no appreciable amount of casein will be dissipated in filling the voids and substantially all the casein which is used will be applicable to reducing the product to the proper fluidity.

Another advantage resulting from the use of my improved product in coated paper is its ability to "hold up" overprint varnishes and prevent such varnishes from soaking into the coating. If the overprint varnish soaks into or is absorbed to any degree in the coating, a dull and lustreless finish will result. With my product, however, coatings can be produced which will permit the full lustre or gloss expected from the overprint varnish to be realized, this being due to the character of my product which has a low absorbency.

Furthermore, my investigations show that the clean surfaces of the particles of my product which are free from water-soluble acids, alkalies and salts, provide a preferential absorption for the vehicle of the varnish which results in such varnish being retained immobile on the surface of the particles, thereby greatly restricting any tendency of such vehicle to migrate into the coating of the paper.

A common measure of the suitability of paper coatings comprising inert fillers and water soluble adhesives, such as casein, soya bean proteins or starch, is the wax test. A large proportion of coated papers are expected to meet a No. 5 Dennison wax test. I have discovered that when calcite ground to a fine powder, such as will contain particles not larger than approximately 15 microns in diameter and heretofore described as my product, comprises all or a substantial part of the inert filler in a water soluble adhesive bound paper coating, such a coating has new and useful advantages over those coatings comprising in part the precipitated calcium carbonate now in common use. To demonstrate these advantages I have compared not only the most finely ground commercially available calcite, but also a precipitated calcium carbonate widely used for paper coatings with coatings containing my product. In the test formula, the proportion of casein was varied because I found each calcium carbonate required a different proportion of casein to get the No. 5 wax test.

The weight of water necessary to develop good spreading was varied to suit the filler used.

It will be noted that the coating made with my product not only displays a considerable economy in the amount of casein required, but also requires far less water for good spreading. Wet coatings, freshly applied to paper, must be dried, the cost of drying is in proportion to the amount of water which must be removed. The economy in the use of my product is apparent upon study of the data given herewith.

My product displays an ability to make a coating which will hold up an overprint varnish. This function is not characteristic of any precipitated whiting which has come to my notice.

The table which follows shows the comparative characteristics of paper coatings made with my product and with precipitated whiting showing a specific surface area of 25,000 square feet per pound and also ground limestone whiting of the finest grade commercially available other than my product.

*Recipe used to make coatings*

| | Pounds |
|---|---|
| Calcium carbonate powder | 300 |
| Water (as noted below) | 160–400 |
| Soda ash | 4.4 |
| Casein (as noted below 9–19% based on amount of carbonate used) | 27–57 |
| Borax | 0.7 |
| Soluble pine oil | 3.0 |

| | Percent casein necessary for #5 wax test | Brightness B. & L. | Gloss Intersoll deg. | Abrasion to type | Overprint varnish hold-up |
|---|---|---|---|---|---|
| Ground limestone whiting, finest grade commercially available other than my product. | 9 | Not tested because of general unsuitability. | | Very bad. | Not tested. |
| My product described herein. | 11 | 91 | 31.2 | None. | Good. |
| Precipitated whiting showing a specific surface area of 25,000 square feet per pound. | 19 | 90 | 30.3 | None. | Poor. |

| | Printability definition | Pounds water in formula to spread well |
|---|---|---|
| Ground limestone whiting, finest grade commercially available other than my product. | Definition poor. | Not tested. |
| My product described herein | Good | 160. |
| Precipitated whiting showing a specific surface area of 25,000 square feet per pound. | Good | 400. |

In 1934 Depew and Easley recommended, in the Journal of Industrial & Engineering Chemistry, volume 26, page 1187, that there be a maximum size of approximately 15 microns in particles of calcium carbonate when used in rubber compositions.

They pointed out that when particles larger than this dimension are incorporated in a rubber compound and the rubber stretched, those particles exceeding 15 microns would fail to adhere securely to the rubber compound. They made no statement limiting the particulate size of the whiting under this dimension either in aggregation of particles or specific surface area.

Other than my product, for which I disclose herewith limitations and a method of manufacture, I have been unable to obtain a commercial product made by grinding limestone, marble, or the like, not only to comply with my limitations, but also to that set forth by Depew and Easley.

I append herewith comparisons between the most finely ground limestone whiting I have been able to obtain from commercial production and my product described herein. Also given, are further comparisons with surface coated and uncoated precipitated whitings.

It will be noted that my product is definitely higher in tensile strength and ultimate elongation at break than the other ground limestone whiting. It will also be noted that the number of particles pulling loose upon a 200% elongation is definitely superior, not only to the ground limestone whiting, but also to the uncoated precipitated whiting.

Attention is called to the finding that where high extensibility or stretch is required, rubber into which my product is compounded, although showing a slightly lower tensile strength than the rubber containing coated precipitated whiting, is nevertheless superior in ultimate elongation to rubber containing any of the other types of whiting tested.

The table given below shows different characteristics exhibited by rubber when made with different products as a filler, one of which products is that involving this invention:

| | Pounds |
|---|---|
| Rubber (smoked sheets) | 100 |
| Zinc oxide | 5 |
| Stearic acid | 1 |
| Sulphur | 2.5 |
| Mercaptobenzothiazole | 1.2 |
| Whiting (designated) | 43 |

Cured at forty pounds steam pressure. Press cures, data given below at optimum cure.

| | Number of particles or aggregates separated at 200% elongation | Tensile strength | Ultimate elongation at break |
|---|---|---|---|
| | Per sq. in. | Lbs. per sq. inch | Per cent |
| Ground limestone whiting, finest grade commercially obtainable other than my product | 35 | 2,360 | 680 |
| My product described herein | 2 | 2,910 | 705 |
| Precipitated whiting coated with hydrogenated abietic acid | 3 | 2,975 | 640 |
| Precipitated whiting, not coated, showing a specific surface area of 25,000 square feet per pound | 14 | 2,230 | 590 |

From the above it will be observed that rubber having my product incorporated therein as a filler has practically the same tensile strength as rubber made with precipitated whiting coated with hydrogenated abietic acid and that it has a greatly superior ultimate elongation. It also shows that at 200% elongation, rubber having my product incorporated therein as a filler will be found to have fewer of the particles or aggregates per square inch separated than any of the other products.

I attribute the superior characteristics of rubber made with my product as compared with rubber having other calcium carbonate fillers as being due to the clean surfaces of the particles and to the fact that the large number of particles of minimum size found in my product provide for a better and more even distribution of the filler throughout the rubber.

The following is descriptive of one process or series of steps which I have successfully used in making my improved product.

For raw material I used white marble or limestone of calcite form which was relatively free from silica, iron clay, manganese, copper or other heavy minerals. This raw material was crushed to a size which could be fed in controllable quantities to a wet grinding pebble mill, and in practice the raw material was crushed so that the maximum lump average about three inches in diameter. During the crushing operation, considerable fine particles termed "sand" at times developed and this was largely removed by screening the material through a five-mesh screen. The crushed raw material was then fed at a constant rate to a wet grinding pebble mill, and the mill I successfully used was one loaded with five tons of pebbles and was operated at twenty-three revolutions a minute. The crushed raw material was fed to this pebble mill at a constant rate of approximately 650 pounds per hour, and water at a temperature of approximately 50° F. was also fed to the mill at a constant rate of 3,150 pounds per hour. The mill was so operated as to keep the tumbling rocks therein at a suitable distance below the overflow spout (approximately sixteen inches) so that oversize pebbles and rocks would not be thrown out during surges. A circulating load of 800% was maintained in the mill by flowing the effluent from the mill through a classifier and returning the settled oversize directly back to the intake of the mill. The mill was further so operated that the effluent therefrom was 30% to 35% solid matter and contained approximately 10% of particles smaller than fifteen microns. This effluent from the mill, containing approximately 10% of particles smaller than fifteen microns and also containing 30% to 35% of solid matter, was delivered to a de-gritting centrifuge which was so regulated that no particles essentially larger than fifteen microns in diameter would leave it as a finished product, all oversize particles being delivered as rejects and returned to the pebble mill. The material was delivered to the centrifuge at a rate of 1,450 gallons per minute, and the centrifuge was rotating at a speed of 850 R. P. M. To provide for a constant delivery to the centrifuge, the effluent from the mill was pumped to a constant head tank and from there fed in the regulated volume to the degritting centrifuge. The effluent from the centrifuge was sieved through a 300-mesh screen and then was dewatered to a consistency that would permit thorough drying at temperatures such as would not develop free calcium oxide or calcium hydroxide. A temperature not exceeding 350° F. is suitable for this purpose. The dried material was then disintegrated to powder by means such as a high-speed hammer disintegrator and the resulting product was the product of this invention, consisting of finely divided calcium carbonate in calcite form having a particle size such that 99.8% by weight of the product is composed of particles less than 15 microns in diameter and having a weight mean average particle size of less than 3.7 microns and proportioned percentages of particles smaller than 1 micron such as will develop a specific surface area of not less than 20,000 square feet per pound.

The accompanying drawing is in the nature of a flow sheet illustrating the various steps employed in producing my improved product by the process I have indicated above. 1 indicates a crusher by which the raw material is crushed so that the maximum lump would average about three inches in diameter. From the crusher, the material is passed to feeders 2 by which said material is fed to wet grinding pebble mills 3, a plurality of pebble mills being shown. The effluent from these mills, which contains from 30% to 35% solid matter and also contains approximately 10% of particles smaller than 15 microns in diameter, is fed to a constant head tank 4, from which it is delivered to the degritting centrifuge 5, said centrifuge being adjusted so that no particles larger than about fifteen microns in diameter will leave it as a finished product, all over-sized particles being delivered as rejects and returned to the pebble mills. The effluent from the centrifuge 5 flows to a sedimentation tank 6 where it is de-watered by sedimentation to a consistency which will permit thorough drying at temperatures which will not develop free calcium oxide or calcium hydroxide. The dewatered material then passes to the dryer 7 where it is dried at a temperature not exceeding 350° F., and from the dryer the dried material is taken to a disintegrator 8 by which it is disintegrated into a free flowing powder. This powder is conveyed to packing devices 9 where the product is packed into suitable bags or other containers.

The ground calcitic rock produced by my process of manufacture has properties such that it follows the Rosin-Rammler distribution law over essentially the entire range of particle sizes. Austin, in the reference before cited, shows a means of graphical representation when the Rosin-Rammler distribution law is applied to a powder. When my product is so designated, it plots as a straight line between the ½ micron and the 10-micron limits.

I have also referred to Roller and to Heywood. Both of these gentlemen call attention to the fact that these straight line distributions indicate that a material thus representative must be a single and individual type of particulate material and that, among other things, the particles will be found to have a similar characteristic shape. It is stated that when the distribution plots have a convex or a concave curve line, instead of a straight line, such indicates that the powder is actually a mixture of two or more particulate distributions, or two or more allotropic types of the same material. In other words, such a powder will be found to be a mixture of two or more powders, each having different particle shapes, aggregations or uniformity.

When precipitated carbonates are tested for particle size distribution and the test data is designated by plotting along a Rosin-Rammler graphical representation, it will be discovered that this type of calcium carbonate powder plots as a curved line.

Examination with the microscope often confirms this mathematical indication that these precipitates are a mixture of differently shaped particles of calcium carbonate.

Comparisons between my product and the most finely ground calcitic rock powder commercially available (other than my product) have shown that sound reproducing records comprising my product have a substantially lower nose factor than that obtained with the coarser product.

Comparisons between my product and precipitated calcium carbonates, each comprising the filler, in dental pastes, show my product has new and useful functions when so used.

The adhesive binders used in dental pastes are not only more costly than the inert filler used, but these binders are proportioned to the filler so that the paste has a definite plasticity. If the inert filler is such that less binder is needed to develop a given plasticity, then not only does an economy result, but the proportion of scouring, or cleaning agent, i. e., the inert filler, is usefully increased.

To develop similar plasticity to that obtained with a precipitated calcium carbonate now being used for this purpose, I find less than one-half of the binding agent which is necessary for the precipitated carbonate is similarly necessary for my filler.

I claim:

1. A calcium carbonate product in powder form comprising mechanically ground limestone particles of which approximately 99.8% by weight are substantially smaller than fifteen microns in diameter and at least 17% by weight of the particles have a diameter no greater than one micron, the aggregation of particles within the said specified percentages being such as will substantially follow the Rosin-Rammler law of particulate distribution.

2. A calcium carbonate product in powder form comprising mechanically ground limestone particles of which at least 17% by weight of the particles have a diameter no greater than one micron, said product having a weight mean average particle diameter of approximately 3.7 microns, the distribution designated by said weight mean particle size and said 17% being such as will substantially follow the Rosin-Rammler law of particulate distribution.

3. A calcium carbonate product in powder form comprising mechanically ground limestone particles of which approximately 99.8% by weight are smaller than fifteen microns in diameter and at least 17% by weight of the particles have a diameter no greater than one micron, the aggregation of particles between said specified percentages being such as will substantially follow the Rosin-Rammler law of particulate distribution and the particle percentage under one micron being such that the particulate surface area of the entire powder is not less than twenty thousand square feet per pound.

4. A calcium carbonate product in powder form comprising mechanically ground white crystalline calcitic marble particles, said powder being substantially free of particles larger than 15 microns in diameter, and at least 17% by weight of the particles having a diameter no greater than one micron, the aggregation of particles within the said specified ranges being such as will substantially follow the Rosin-Rammler law of particulate distribution.

5. An inert filler in powder form comprising mechanically ground white crystalline calcitic marble particles, said powder being substantially free of particles larger than fifteen microns in diameter and at least 17% by weight of the particles comprising the powder having a diameter no greater than one micron, said powder having a weight mean average particle diameter of less than approximately 3.7 microns, and the aggregation of particles between said sizes being such as will substantially follow the Rosin-Rammler law of particulate distribution.

6. An inert filler in powder form comprising mechanically ground crystalline calcitic marble particles, said powder being substantially free of particles larger than fifteen microns in diameter and at least 17% by weight of the particles comprising the powder having a diameter no greater than one micron, said powder having a weight mean average particle diameter of less than approximately 3.7 microns, the aggregation of particles between said sizes being such as will substantially follow the Rosin-Rammler law of particulate distribution, and also being such that the specific surface area of the entire powder is not less than twenty thousand square feet per pound.

7. An improved coating for wood, paper and other material having an inert pigment therein in powder form comprising calcium carbonate particles having the characteristics set forth in claim 2.

8. An improved rubber compound which comprises rubber having incorporated therein a calcium carbonate product in powder form comprising calcium carbonate particles having the characteristics set forth in claim 2.

9. A plastic containing an inert pigment filler in the form of calcium carbonate particles having the characteristics set forth in claim 2.

10. A filler for paint comprising mechanically ground calcitic limestone particles substantially free of particles larger than 15 microns, the particles varying in size substantially in accordance with the Rosin-Rammler law and at least 17% thereof having a diameter no greater than one micron.

11. The method of producing a filler for rubber composition which comprises mechanically grinding limestone in water and reducing the same to particles substantially all of which are smaller than 15 microns in diameter and distributed in size below said diameter substantially in accordance with the Rosin-Rammler law.

12. A calcium carbonate product in powder form comprising mechanically ground white crystalline calcitic marble which has 17% by weight of the particles of a diameter no greater than one micron, said product having a weight mean average particle diameter of approximately 3.7 microns, the distribution designated by said weight mean particle size and said 17% being such as will substantially follow the Rosin-Rammler law of particulate distribution.

ALAN R. LUKENS.